(12) United States Patent
Wang et al.

(10) Patent No.: US 12,387,392 B2
(45) Date of Patent: Aug. 12, 2025

(54) HYBRID IMAGE RECONSTRUCTION SYSTEM

(71) Applicant: Rensselaer Polytechnic Institute, Troy, NY (US)

(72) Inventors: Ge Wang, Loudonville, NY (US); Weiwen Wu, Troy, NY (US); Wenxiang Cong, Albany, NY (US); Hengyong Yu, Westford, MA (US)

(73) Assignee: Rensselaer Polytechnic Institute, Troy, NY (US)

( * ) Notice: Subject to any disclaimer, the term of this patent is extended or adjusted under 35 U.S.C. 154(b) by 710 days.

(21) Appl. No.: 17/393,922

(22) Filed: Aug. 4, 2021

(65) Prior Publication Data

US 2022/0044452 A1 Feb. 10, 2022

Related U.S. Application Data

(60) Provisional application No. 63/167,079, filed on Mar. 28, 2021, provisional application No. 63/060,866, filed on Aug. 4, 2020.

(51) Int. Cl.
*G06T 11/00* (2006.01)
*G06N 3/04* (2023.01)
*G06N 3/08* (2023.01)

(52) U.S. Cl.
CPC .............. *G06T 11/005* (2013.01); *G06N 3/04* (2013.01); *G06N 3/08* (2013.01); *G06T 2210/41* (2013.01)

(58) Field of Classification Search
CPC ....... G06T 2210/41; G06T 2207/10076; G06T 11/008; G06T 2207/10072;
(Continued)

(56) References Cited

U.S. PATENT DOCUMENTS 6,577,700 B1 * 6/2003 Fan .................. G01N 27/24
378/4
9,305,379 B2 * 4/2016 Stayman .............. G06T 7/38
(Continued)

FOREIGN PATENT DOCUMENTS

EP          3825712 A1 *  5/2021  ............. A61B 5/055
WO    WO-2017223560 A1 * 12/2017  ............... A61B 5/00
(Continued)

OTHER PUBLICATIONS

Morteza Mardani et al., "Deep Generative Adversarial Neural Networks for Compressive Sensing MRI", Jan. 2019, IEEE Transactions on Medical Imaging, vol. 38, No. 1, Jan. 2019. (Year: 2019).*

(Continued)

*Primary Examiner* — Manav Seth
(74) *Attorney, Agent, or Firm* — Barclay Damon LLP; Anthony P. Gangemi

(57) ABSTRACT

Generally, there is provided a hybrid image reconstruction system. The hybrid image reconstruction system includes a deep learning stage and a compressed sensing stage. The deep learning stage is configured to receive an input data set that includes measured tomographic data and to produce a deep learning stage output. The deep learning stage includes a mapping circuitry, and at least one artificial neural network. The mapping circuitry is configured to map image domain data to a tomographic data domain. The compressed sensing stage is configured to receive the deep learning stage output and to provide refined image data as output.

23 Claims, 4 Drawing Sheets

(58) Field of Classification Search
CPC . G06T 2207/30004; G06T 2207/10104; G06T 2207/10108; G06T 11/005; G06T 5/00; G06T 2211/441; G06T 2211/436; G06T 2211/424; G06T 2207/20081; G06T 2207/20084; A61B 6/032; A61B 6/5205; A61B 6/52; G06F 18/253; G06F 18/214–2155; G06F 7/023; G06F 40/16; G06N 3/04; G06N 3/08; G06N 3/088; G06N 3/094; G06N 3/02–126; G06N 20/00–20; G06K 9/6256; G06K 9/6257; G06K 9/6259; G06V 10/70; G06V 10/82; G06V 10/774–7796

See application file for complete search history.

(56) References Cited

U.S. PATENT DOCUMENTS

| | | | |
|---|---|---|---|
| 10,002,447 | B1 | 6/2018 | Cao |
| 10,049,446 | B2 | 8/2018 | Simon |
| 10,055,861 | B2 | 8/2018 | Dempsey |
| 10,140,734 | B2 | 11/2018 | Chen |
| 10,475,214 | B2 | 11/2019 | Fu |
| 10,607,378 | B2 | 3/2020 | Jarisch |
| 10,628,973 | B2 | 4/2020 | De Man |
| 10,970,887 | B2 * | 4/2021 | Wang ........................ A61B 5/00 |
| 11,454,690 | B2 * | 9/2022 | Wang .................... G01R 33/543 |
| 2011/0142316 | A1 * | 6/2011 | Wang .................... G06T 11/006 |
| | | | 382/131 |
| 2016/0012615 | A1 * | 1/2016 | Gao ....................... G06T 11/005 |
| | | | 382/131 |
| 2016/0117850 | A1 * | 4/2016 | Jin ............................ A61B 6/03 |
| | | | 382/131 |
| 2016/0339381 | A1 | 11/2016 | Flaßpohler et al. |
| 2018/0197317 | A1 | 7/2018 | Cheng et al. |
| 2019/0012814 | A1 | 1/2019 | Dempsey et al. |
| 2019/0251713 | A1 | 8/2019 | Chen et al. |
| 2019/0325621 | A1 * | 10/2019 | Wang ....................... G06N 3/045 |
| 2019/0328348 | A1 | 10/2019 | De Man et al. |
| 2019/0378311 | A1 | 12/2019 | Mailhe et al. |
| 2020/0043204 | A1 | 2/2020 | Fu et al. |
| 2020/0090385 | A1 | 3/2020 | Jarisch |
| 2021/0118200 | A1 * | 4/2021 | Akcakaya ................. G06N 3/08 |

FOREIGN PATENT DOCUMENTS

| | | | | |
|---|---|---|---|---|
| WO | WO-2018232388 | A1 * | 12/2018 | ........... A61B 5/7267 |
| WO | WO-2020163783 | A1 * | 8/2020 | ............... A61B 5/00 |

OTHER PUBLICATIONS

Maximilian Seitzer et al., "Adversarial and Perceptual Refinement for Compressed Sensing MRI Reconstruction", Jun. 28, 2018, https://arxiv.org/abs/1806.11216. (Year: 2018).*

Weiwen Wu et al., "Stabilizing Deep Tomographic Reconstruction Networks", Aug. 4, 2020, https://arxiv.org/abs/2008.01846v1. (Year: 2020).*

Li et al., 2011, "A compressed sensing-based iterative algorithm for CT reconstruction and its possible application to phase contrast imaging" (pp. 1-14) (Year: 2011).*

Sidky et al.; "Do CNNs solve the CT inverse problem?", May 21, 2020; 12 pages.

* cited by examiner

HYBRID IMAGE RECONSTRUCTION SYSTEM

CROSS REFERENCE TO RELATED APPLICATION(S)

This application claims the benefit of U.S. Provisional Application No. 63/060,866, filed Aug. 4, 2020, and U.S. Provisional Application No. 63/167,079, filed Mar. 28, 2021, which are incorporated by reference as if disclosed herein in their entireties.

GOVERNMENT LICENSE RIGHTS

This invention was made with government support under award numbers EB017140, CA237267, CA233888, and EB026646, awarded by the National Institutes of Health. The government has certain rights in the invention.

FIELD

The present disclosure is related to a reconstruction system, in particular to, a hybrid image reconstruction system.

BACKGROUND

Tomographic image reconstruction with deep learning (DL) is an emerging field of applied artificial intelligence. At least some deep reconstruction networks may be unstable such as for computed tomography (CT) and magnetic resonance imaging (MRI). Instabilities may include, for example, strong output artefacts from tiny perturbation, small features being undetectable, and increased input data degrading performance. Such instabilities may be contrasted to sparsity-regularized reconstruction methods that do not suffer from these instabilities, due, at least in part, to kernel awareness. Since deep reconstruction is a mainstream approach to achieve better tomographic image quality, there is a need for stabilizing deep tomographic reconstruction networks.

Deep learning has attracted attention in the field of tomographic image reconstruction, including, for example, CT, MM, positron emission tomography/single photon emission computed tomography (PET/SPECT), ultrasound and optical imaging. Sparse-view CT, in particular, remains a challenge that targets an acceptable image reconstruction from ultra-sparse projections.

SUMMARY

In some embodiments, there is provided a hybrid image reconstruction system. The hybrid image reconstruction system includes a deep learning stage and a compressed sensing stage. The deep learning stage is configured to receive an input data set that includes measured tomographic data and to produce a deep learning stage output. The deep learning stage includes a mapping circuitry, and at least one artificial neural network. The mapping circuitry is configured to map image domain data to a tomographic data domain. The compressed sensing stage is configured to receive the deep learning stage output and to provide refined image data as output.

In some embodiments of the hybrid image reconstruction system, the deep learning stage includes an initial reconstruction network circuitry, and a deep learning stage refinement circuitry including at least one mapping circuitry, and at least one residual reconstruction network circuitry. The compressed sensing stage includes an initial compressed sensing circuitry, and a compressed sensing stage refinement circuitry including at least one refinement compressed sensing circuitry. At least a portion of the deep learning stage refinement circuitry and at least a portion of the compressed sensing stage refinement circuitry correspond to a refinement stage. The initial reconstruction network circuitry is configured to receive the input data set and to reconstruct a corresponding initial image data. The initial compressed sensing circuitry is configured to regularize the initial image data to yield an estimated image data. Each mapping circuitry is configured to receive a prior compressed sensing circuitry image data output and to produce a respective corresponding projection data set. Each residual reconstruction network circuitry is configured to receive a respective residual projection data set corresponding to a difference between the input data set and the respective prior corresponding projection data set and to determine a respective corresponding residual image data. Each refinement compressed sensing circuitry is configured to receive a sum of a prior compressed sensing circuitry image data output and the respective corresponding residual image data and to produce a respective refined image data output.

In some embodiments of the hybrid image reconstruction system, a system architecture corresponds to an unrolled network architecture that comprises a plurality of refinement stages.

In some embodiments of the hybrid image reconstruction system, a respective refinement stage includes a respective mapping circuitry, a respective residual reconstruction circuitry and a respective refinement compressed sensing circuitry.

In some embodiments of the hybrid image reconstruction system, each residual projection data set is normalized and each residual image data is denormalized.

In some embodiments of the hybrid image reconstruction system, the deep learning stage includes an initial reconstruction circuitry, and a refinement circuitry. The initial reconstruction circuitry is configured to receive the input data set, to determine an estimated projection data set based, at least in part, on the input data set, and to determine an refined image data set based, at least in part, on the estimated projection data set. The refinement circuitry is configured to receive the estimated projection data set and the refined image domain data set, and to determine an updated data—image pair. The updated data—image pair corresponds to the deep learning stage output.

In some embodiments of the hybrid image reconstruction system, the initial reconstruction circuitry includes a projection network circuitry, and an image domain network circuitry. The refinement circuitry includes a residual data network circuitry, and an image residual network circuitry. Each network circuitry corresponds to an artificial neural network configured to operate in a projection data domain or an image data domain.

In some embodiments of the hybrid image reconstruction system, the input data set is sparse and the estimated measurements are relatively highly dimensional.

In some embodiments of the hybrid image reconstruction system, the projection network circuitry and the image domain network circuitry each corresponds to a respective encode-decode network and the image domain network circuitry corresponds to a generative adversarial network (GAN).

In some embodiments of the hybrid image reconstruction system, the input data is selected from the group including computed tomography (CT), magnetic resonance imaging (MRI), positron emission tomography (PET), and single photon emission computed tomography (SPECT) tomographic data.

In an embodiment, there is provided a method for hybrid image reconstruction. The method includes receiving, by a deep learning stage, an input data set comprising measured tomographic data; and producing, by the deep learning stage, a deep learning stage output. The deep learning stage includes a mapping circuitry, and at least one artificial neural network. The mapping circuitry is configured to map image domain data to a tomographic data domain. The method further includes receiving, by a compressed sensing stage, the deep learning stage output; and providing, by the compressed sensing stage, refined image data as output.

In some embodiments of the method, the deep learning stage includes an initial reconstruction network circuitry, and a deep learning stage refinement circuitry comprising at least one mapping circuitry, and at least one residual reconstruction network circuitry, and the compressed sensing stage comprises an initial compressed sensing circuitry, and a compressed sensing stage refinement circuitry comprising at least one refinement compressed sensing circuitry, at least a portion of the deep learning stage refinement circuitry and at least a portion of the compressed sensing stage refinement circuitry corresponding to a refinement stage. The method further includes reconstructing, by the initial reconstruction network circuitry, a corresponding initial image data based, at least in part, on the input data set; and regularizing, by the initial compressed sensing circuitry, the initial image data to yield an estimated image data. The method further includes producing, by each mapping circuitry, a respective corresponding projection data set based, at least in part on, a prior compressed sensing circuitry image data output; producing, by each residual reconstruction network circuitry, a respective corresponding residual image data based, at least in part, on a respective residual projection data set corresponding to a difference between the input data set and the respective prior corresponding projection data set; receiving, by each refinement compressed sensing circuitry, a sum of a prior compressed sensing circuitry image data output and the respective corresponding residual image data; and producing, by each refinement compressed sensing circuitry, a respective refined image data output.

In some embodiments of the method, a system architecture corresponds to an unrolled network architecture that comprises a plurality of refinement stages.

In some embodiments of the method, a respective refinement stage includes a respective mapping circuitry, a respective residual reconstruction circuitry and a respective refinement compressed sensing circuitry.

In some embodiments of the method, each residual projection data set is normalized and each residual image data is denormalized.

In some embodiments of the method, the deep learning stage includes an initial reconstruction circuitry, and a refinement circuitry. The method further includes receiving, by the initial reconstruction circuitry, the input data set; determining, by the initial reconstruction circuitry, an estimated projection data set based, at least in part, on the input data set; determining, by the initial reconstruction circuitry, an refined image data set based, at least in part, on the estimated projection data set. The method further includes receiving, by the refinement circuitry, the estimated projection data set and the refined image domain data set; and determining, by the refinement circuitry, an updated data—image pair. The updated data—image pair corresponds to the deep learning stage output.

In some embodiments of the method, the initial reconstruction circuitry includes a projection network circuitry, and an image domain network circuitry. The refinement circuitry includes a residual data network circuitry, and an image residual network circuitry. Each network circuitry corresponds to an artificial neural network configured to operate in a projection data domain or an image data domain.

In some embodiments of the method, the input data set is sparse and the estimated measurements are relatively highly dimensional.

In some embodiments of the method, the projection network circuitry and the image domain network circuitry each corresponds to a respective encode-decode network and the image domain network circuitry corresponds to a generative adversarial network (GAN).

In some embodiments of the method, the input data is selected from the group including computed tomography (CT), magnetic resonance imaging (MM), positron emission tomography (PET), and single photon emission computed tomography (SPECT) input data.

In some embodiments, a computer readable storage device having stored thereon instructions that when executed by one or more processors result in the following operations including any one of the embodiments of the method.

BRIEF DESCRIPTION OF THE DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

DETAILED DESCRIPTION

Figure 1:
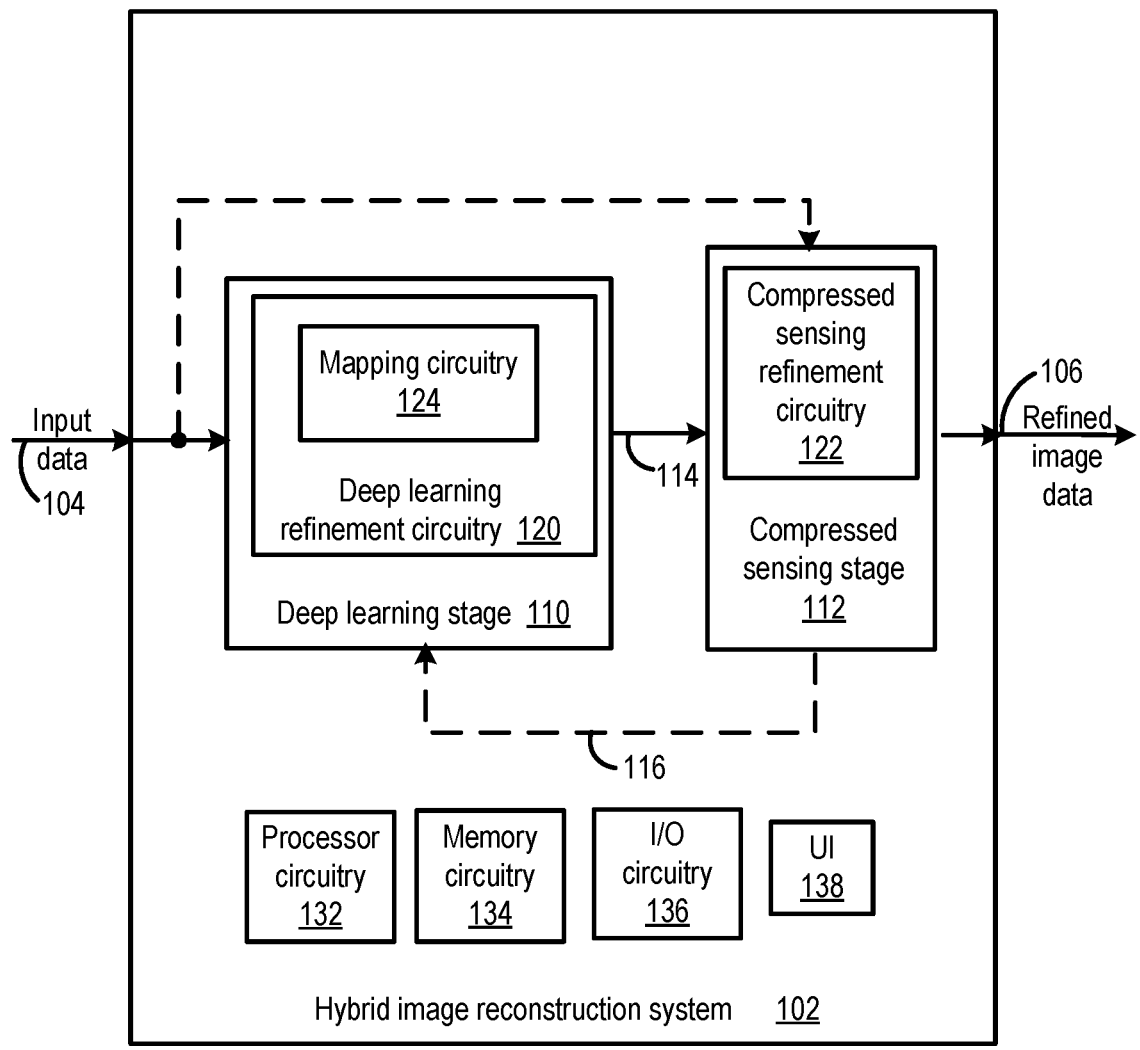
FIG. 1 illustrates a functional block diagram of a hybrid image reconstruction system consistent with several embodiments of the present disclosure.

Generally, this disclosure relates to a hybrid image reconstruction system. In some embodiments, the hybrid image reconstruction system includes a deep learning stage and a compressed sensing stage. The deep learning stage is configured to receive an input data set that includes measured tomographic data and to produce a deep learning stage output. The deep learning stage includes a mapping circuitry, and at least one artificial neural network. The mapping circuitry is configured to map image domain data to a tomographic data domain. The compressed sensing stage is configured to receive the deep learning stage output and to provide refined image data as output.

In one embodiment, the hybrid image reconstruction system may correspond to an analytic compressive iterative deep framework ("ACID"). In another embodiment, the hybrid image reconstruction system may correspond to a dual-domain residual-based optimization network (DRONE). A deep reconstruction network may be stabilized in a hybrid model that combines deep learning and compressed sensing.

Turning first to the ACID embodiment, given a deep reconstruction network and measurement data (i.e., input data), an image can first be reconstructed by the reconstruction network but the reconstruction may compromise fine details and/or introduce artifacts. A compressed sensing inspired module may be used to enforce sparsity in the image domain, with a loss function configured to capture both data fidelity and sparsity (e.g., total variation (TV), low-rank, dictionary learning, etc.). A forward imaging model may be configured to project an intermediate reconstructed image to a raw data domain to estimate tomographic data. It may be appreciated that estimated tomographic data may be generally differ from the original data. The difference is a data residual that may not be explained by the current image. From the data residual, an incremental image may be reconstructed with the reconstruction network to update the current image through the reconstruction network. The process may be repeated to prevent losing or falsifying features. ACID may thus generally include three modules: deep reconstruction for data-driven priors ("deep"), compressed sensing inspired sparsity promotion ("compressive"), and analytic mapping to estimate data ("analytic"). Workflow through the three modules may be iterative, cycling through these three modules providing a solution in an intersection of the space of data-driven solutions, the space of sparse solutions, and the space of solutions subject to data constraints.

It may be appreciated that stability of a hybrid image reconstruction system may be related to convergence. For example, stability may be related to convergence of an ACID iterative workflow. A bounded error norm (BEN) property of a proper reconstruction network, as characterized by a ratio being less than 1 between a norm of a reconstruction error and a norm of a corresponding ground truth; that is, the error component of the initial image reconstructed by a deep network, e.g., reconstruction network circuitry of FIG. 2, as described herein, is less than a ground truth image in an L2 norm sense. The error includes two components: sparse and non-sparse. The non-sparse component may then be effectively suppressed by a compressive sensing (CS) inspired sparsity promotion module, e.g., compressed sensing circuitry of FIG. 2.

The sparse errors are either observable or unobservable. The unobservable error is in the null space of the system matrix A (e.g., mapping circuitry of FIG. 2), and should be small relative to the null space component of the ground truth image because a proper reconstruction network is intended to recover the null space component well in a data-driven fashion. ACID may eliminate the observable error iteratively, thanks to the BEN property. Specifically, the output of the module $\Theta$ (i.e., compressed sensing circuitry) is re-projected by the system matrix A, and then the estimated data may be compared with the measured data. The difference is the data residual due to the observable error component. To suppress this error component, the reconstruction network $\Phi$ may be used to reconstruct an incremental image and update the current image with the module $\Theta$ (i.e., compressed sensing circuitry). In this correction step, the desirable incremental image is the new ground truth image, and the BEN property holds to make this step a contraction mapping; in other words, the associated new observable error is less than the previous observable error, thanks to the BEN property. Repeating this process many times, the observable error component will diminish geometrically (the ratio less than 1), so that the ACID solution will simultaneously incorporate data-driven knowledge, sparsity preference, and measurement data consistency.

In operation, the ACID reconstruction network is configured to transform an original measurement (e.g., a sinogram or a k-space dataset) into an initial image. The initial image may reflect a relatively strong image prior knowledge extracted from big data (e.g., CT or Mill data). This initial image is subject to errors and instabilities. The current image may then be improved by a compressed sensing inspired sparsity promotion module to output a sparsified image. Based, at least in part, on this sparse image, measurement data may be estimated using a system model (e.g., analytic mapping, A). The estimated and measured data may then be compared to determine a residual data that reflect observable errors, indicating whether the current image needs correction. A residual may be configured by the same deep reconstruction network to produce an incremental image on the top of the current image to form an updated image. This updated image is again processed by the compressed sensing module. This iterative process may be repeated to improve the current image gradually.

Thus, ACID may be configured to overcome at least some instabilities of neural networks indicating that accurate and stable deep reconstruction is feasible. The ACID network is configured to combine a sparsity-oriented algorithm, a data-driven direct reconstruction network, and an iterative data fidelity enforcement. It may be appreciated that the converging behavior and solution characteristics of ACID have been analyzed under an assumption termed a bounded error norm, a special case of a Lipschitz continuity. The Lipschitz continuity, used in the convergence analysis, may practically be interpreted as a Bounded Error Norm (BEN) property and has been experimentally verified in our study. Additionally or alternatively, it is not necessary that the measurement matrix satisfy a compressed sensing condition such as the restricted isometry property. This means that a standard sparsity-promotion algorithm may not give a unique solution. In this case, ACID may outperform the sparsity-minimization reconstruction alone, because data-prior may help fill in a gap in deep reconstruction. Last but not the least, in addition to an accurate reconstruction performance, ACID has stability in the two related aspects: (a) ACID can stabilize an unstable deep reconstruction network (by putting it in the ACID framework), and (b) ACID as a whole is resilient against adversarial attacks.

Turning now to the DRONE embodiment, compared to ACID, there are at least four main differences between DRONE and ACID. First, in the DRONE network, the deep prior in the measurement data domain is taken into account through both a projection expander and residual data refinement module, which is beneficial to improve the reconstruction performance, especially for sparse-data CT. Second, the residual data network and the residual image network of DRONE are re-trained using an incremental training-testing strategy, which can effectively avoid overfitting. Third, the predicted data and images are considered in the kernel awareness module simultaneously to further refine the sparse-data CT reconstruction. Finally, deep priors for data and images are utilized only once in DRONE, instead of many times in ACID.

In one nonlimiting example, a classical analytic reconstruction algorithm (e.g., filtered back projection (FBP)) may be used for relatively fast reconstruction. It is contemplated that the image quality may be improved by replacing FBP with an iterative algorithm, such as a simultaneous algebraic reconstruction technique (SART) or an algebraic reconstruction technique (ART). The computational cost may be increased so that it becomes difficult to be implemented in time-sensitive clinical applications. Compared with SART and ART, FBP may be preferred for its efficiency and robustness. It may be appreciated that four network modules are trained for DRONE. It is contemplated that a weakly supervised learning may be utilized to relax a requirement for labeled big data.

Regarding regularization, a total variation (TV) method may be implemented in the awareness module (i.e., compressed sensing circuitry). Other advanced sparsity priors may be used, such as dictionary learning. Advanced priors may improve the image quality but they are computationally demanding. In practice, reconstruction performance and computational overhead should be balanced.

Although the deep learning-based tomographic reconstruction methods have achieved great successes in the past several years, the generalizability and robustness of trained networks is still an open problem in clinical applications. For example, the application of a network trained on data from one type of scanners to data from another type of scanner remains a challenge due to different imaging parameters and various technical factors. A feasible strategy for improving the robustness and generalization of deep tomographic reconstruction is to combine traditional reconstruction methods and deep networks, i.e., a hybrid image reconstruction system. A DRONE network is one example of this approach.

FIG. 1 illustrates a functional block diagram of a hybrid image reconstruction system 102 consistent with several embodiments of the present disclosure. System 102 is configured to receive an input data set, i.e., input data 104, that corresponds to measured data, and to provide refined image data 106 as output. System 102 includes a deep learning stage 110 and a compressed sensing stage 112. As used herein, a deep learning stage is configured to include at least one artificial neural network. The deep learning stage 110 is configured to receive the measured input data 104, to operate on the input data to determine a deep learning stage output, and to provide intermediate data 114 to the compressed sensing stage 112. The intermediate data 114 corresponds to a deep learning stage output.

Input data 104 corresponds to measured input data and may include tomographic data (e.g., projection data, sinogram data, k-space data, and/or raw data) from an imaging scanner. For example, the input data may correspond to projection data from a computed tomography (CT) scanner. In another example, the input data 104 may correspond to k-space data from a magnetic resonance imaging (MM) apparatus. In another example, the input data 104 may correspond to raw data from another imaging technology (e.g., positron emission tomography (PET), ultrasound, single photon emission computed tomography (SPECT), etc.). In some embodiments, the projection data may be sparse. In one nonlimiting example, low dose CT or C-arm CT scans may result in sparse input data.

Compressed sensing stage 112 is configured to receive the deep learning stage output, i.e., the intermediate data 114, and to provide refined image data as output image data 106. The refined image data corresponds to the input data set. In some embodiments, compressed sensing stage 112 may be configured to receive input data 104. In some embodiments, an intermediate output 116 from compressed sensing stage 112 may be provided to deep learning stage 110, as will be described in more detail below. Deep learning stage 110 may include deep learning refinement circuitry 120. Deep learning refinement circuitry may include mapping circuitry 124. Mapping circuitry 124 may include an analytic forward projection model and is configured to link a tomographic data domain and the image domain. In other words, mapping circuitry 124 is configured to provide image-to-data mapping (where "data" corresponds to tomographic data).

Compressed sensing stage 112 may include compressed sensing refinement circuitry 122.

System 102 further includes a processor circuitry 132, a memory circuitry 134, an input/output (I/O) circuitry 136, and a user interface (UI) 138. Processor circuitry 132 may be configured to perform one or more operations of hybrid image reconstruction system 102 (e.g., deep learning stage 110, and/or compressed sensing stage 112). Memory circuitry 134 may include one or more types of memory, as described herein. Memory circuitry 134 may be configured to store information and/or data associated with deep learning stage 110, compressed sensing stage 112, and/or processor circuitry 132, I/O circuitry 136, and/or UI 138. UI 138 may include a user input device (e.g., keyboard, keypad, mouse, touchpad, touch sensitive display, a microphone, etc.) and a user output device (e.g., a display, a loudspeaker, etc.).

In operation, hybrid image reconstruction system 102 may be configured to receive input data 104, to apply both deep learning and compressed sensing techniques and to provide refined reconstructed image data as output while maintaining stability.

Figure 2:
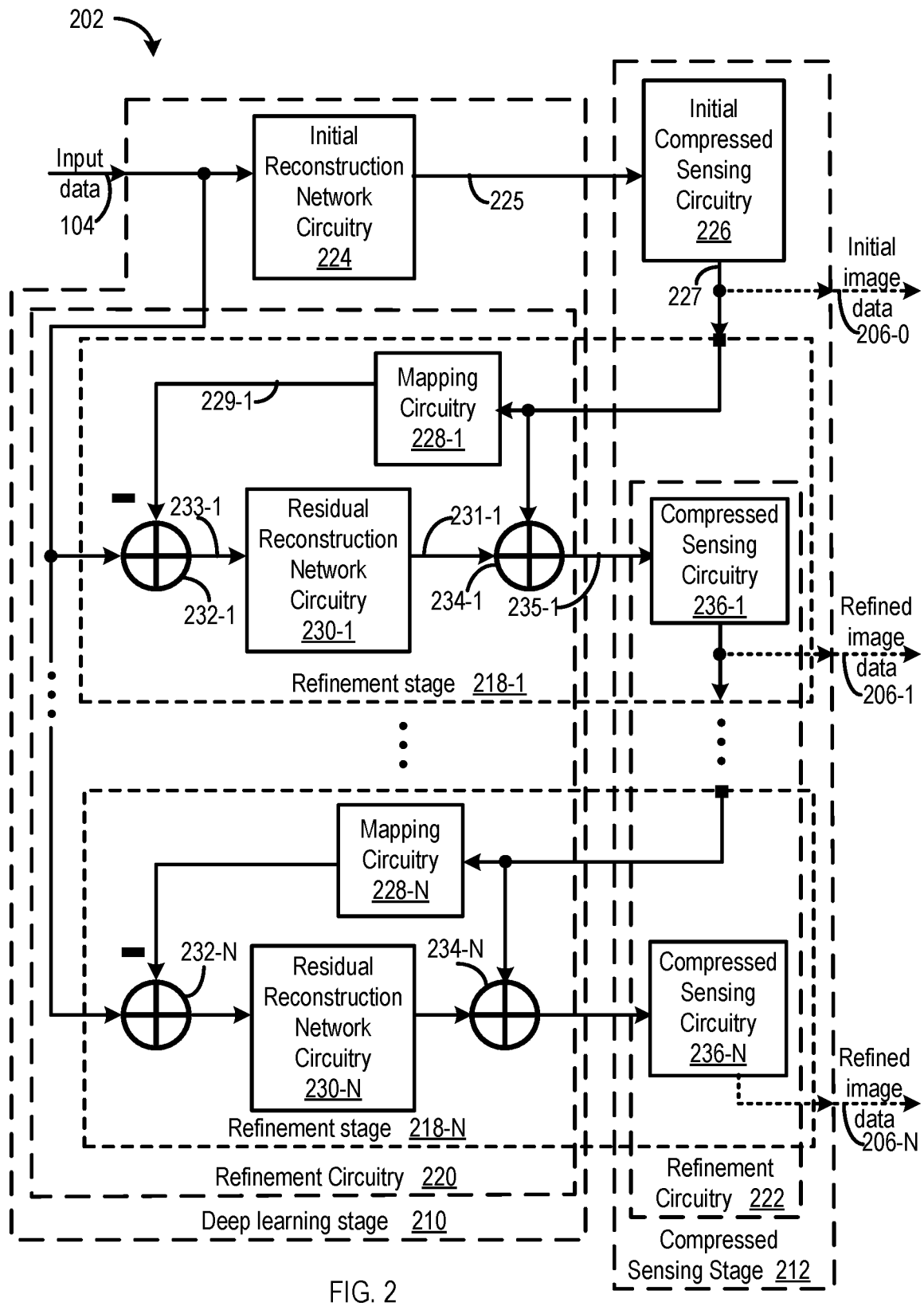
FIG. 2 illustrates a functional block diagram of one embodiment of a hybrid image reconstruction system according to the present disclosure.

FIG. 2 illustrates a functional block diagram of one embodiment of a hybrid image reconstruction system 202 according to the present disclosure. System 202 is one example of hybrid image reconstruction system 102 of FIG. 1. System 202 may be considered as an analytic compressive iterative deep framework ("ACID"). System 202 includes a deep learning stage 210 and a compressed sensing stage 212. The deep learning stage 210 is configured to receive input data, and the compressed sensing stage 212 is configured to provide refined image data as output. The deep learning stage 210 includes initial reconstruction network circuitry 224 and may include deep learning refinement circuitry 220. The compressed sensing stage 212 includes initial compressed sensing circuitry 226 and may include compressed sensing refinement circuitry 222. Thus, deep learning stage 210 is one example of deep learning stage 110 of FIG. 1 and refinement circuitry 220 is one example of deep learning refinement circuitry 120. Similarly, compressed sensing stage 212 is one example of compressed sensing stage 112 and refinement circuitry 222 is one example of compressed sensing refinement circuitry 122.

Hybrid image reconstruction system 202 includes one or more refinement stages 218-1, . . . , 218-N. Each refinement stage 218-1, . . . , 218-N may include at least a portion of elements of deep learning refinement circuitry 220 and at least a portion of elements of compressed sensing refinement circuitry 222. In other words, at least a portion of the deep learning stage refinement circuitry 220 and at least a portion of the compressed sensing stage refinement circuitry 222 correspond to a refinement stage.

A first refinement stage 218-1 includes mapping circuitry 228-1, a residual reconstruction network circuitry 230-1, a first summer (i.e., summing junction) 232-1, a second summer 234-1, and a compressed sensing circuitry 236-1. Mapping circuitry 228-1, residual reconstruction network circuitry 230-1, the first summer 232-1, and the second summer 234-1 are elements of deep learning refinement circuitry 220 and the compressed sensing circuitry 236-1 is an element of compressed sensing refinement circuitry 222. An $N^{th}$ refinement stage 218-N includes mapping circuitry 228-N, a residual reconstruction network circuitry 230-N, a first summer 232-N, a second summer 234-N, and a compressed sensing circuitry 236-N. Mapping circuitry 228-N, residual reconstruction network circuitry 230-N, the first summer 232-N, and the second summer 234-N are elements of deep learning refinement circuitry 220 and the compressed sensing circuitry 236-N is an element of compressed sensing refinement circuitry 222.

Each refinement stage 218-1, . . . , 218-N is configured to receive input data 104 (i.e., projection data) and to provide a respective refined image data 206-1, . . . , 206-N, as output. Each refinement stage 218-1, . . . , 218-N is further configured to receive a prior output image. Each refinement stage 218-1, . . . , 218-N may correspond to one iteration of refinement operations. Each refinement stage 218-1, . . . , 218-N is configured to provide incremental output image quality improvement and the hybrid image reconstruction system 202 may thus be configured to provide a gradual output image quality improvement. A system architecture of hybrid image reconstruction system 202, that includes a plurality of refinement stages 218-1, . . . , 218-N, may thus correspond to an unrolled network architecture.

Initial reconstruction network circuitry 224, and residual reconstruction network circuitry 230-1, . . . , 230-N correspond to deep learning neural networks. An initial compressed sensing circuitry 226, and compressed sensing circuitry 236-1, . . . , 236-N are configured to implement compressed sensing based regularization. Input to initial reconstruction network circuitry 224 is input data, e.g., tomographic data, as described herein. Initial reconstruction network circuitry 224 is configured to reconstruct an initial image, i.e., initial image data 225, and to provide the initial image data 225 (i.e., intermediate image data) to initial compressed sensing circuitry 226. Initial compressed sensing circuitry 226 is configured to regularize the initial image data 225 and to provide as output refined image data 227, corresponding to refined image data 106 of FIG. 1. Output from initial compressed sensing circuitry 227 may be provided to a first refinement stage 218-1, as described herein. Output from initial compressed sensing circuitry 227 may be provided as an initial image data 206-0 output from hybrid tomographic reconstruction system 202.

In some embodiments, system 202 may be configured to refine the initial estimated image data 227 based, at least in part, on the input data 104 and corresponding residual data. Each refinement stage may be configured to refine a prior refined image data. For example, the first refinement stage 218-1 may be configured to refine the initial estimated image data 227 received from initial compressed sensing circuitry 226. Mapping circuitry 228-1 may thus be configured to perform analytic mapping based, at least in part, on a system matrix, A. In an embodiment, the analytic mapping corresponds to a forward projection of refined image data 227 to corresponding estimated input data 229-1, e.g., estimated tomographic data. The first summer 232-1 is then configured to determine a difference between the input data 104 and the estimated input data 229-1 and a corresponding residual 233-1 may then be provided the first residual reconstruction network circuitry 230-1. The residual reconstruction network circuitry 230-1 may also correspond to a deep learning neural network. The residual reconstruction network circuitry 230-1 is configured to reconstruct a residual image 231-1. The second summer 234-1 is configured to receive the reconstructed residual image 231-1 and the initial estimated image data 227, to combine the images and provide a second summer output corresponding to combine the image data 235-1 to compressed sensing circuitry 236-1. Compressed sensing circuitry 236-1 may then be configured to regularize the combined image data 235-1 yield a refined estimated output image corresponding to refined image data 206-1.

Each refinement stage 218-1, . . . , 218-N may thus be configured to receive a prior refined image data from a prior compressed sensing circuitry. Each refinement stage 218-218-N may be further configured to receive the input data 104, and to generate an refined image data output, as described herein. The refined image data output (i.e., refined image data 206-N) of a final refinement stage 218-N may then correspond to refined image data 106 of FIG. 1, i.e., the refined output image data of hybrid image reconstruction system 202, corresponding to input data 104.

Operation of hybrid image reconstruction system 202, i.e., ACID, is described in Table 1: Pseudocode of ACID workflow. In the Table 1, $p^{(0)}$ corresponds to input data 104, neural network $\Phi$ corresponds to reconstruction network circuitry 224, 230-1, . . . , 230-N, and system matrix A corresponds to mapping circuitry 228-1, . . . , 228-N. Equation 1 corresponds to residual data, e.g., residual 233-1 that is output from summer 232-1, and $f^{(k)}$ corresponds to image data of a $k^{th}$ iteration, that is normalized, updated according to Equation 2 and then denormalized.

TABLE 1

Pseudocode of the ACID workflow.

Input: Data $p^{(0)}$, neural network $\Phi$, system matrix A, maximum number of iterations auxiliary parameters $\xi$, $\lambda$, $\mu = 0$, and $k = 1$;
1. If $k<K+1$ do
2.   if $k=1$ do
3.     Computing $\Phi(p^{(0)})$;
4.     Normalizing the $\Phi(p^{(0)})$;
5.     Updating $b^{(1)}$ using Eq. (2) where the normalized $\Phi(p^{(0)})$ is treated as the input;
6.     Updating $f^{(1)}$ by de-normalizing $b^{(1)}$;
7.   else do TABLE 1-continued Pseudocode of the ACID workflow.

8. Computing residual data using $p^{(k+1)} = \frac{\lambda(p^{(0)} - Af^{(k)})}{1 + \lambda + \mu}$;

9. Normalizing the residual data $p^{(k+1)}$ into the input range of neural network;
10. Inputting the normalized data into the neural network $\Phi$ and obtaining $\Phi(p^{(k+1)})$;
11. De-normalizing $\Phi(p^{(k+1)})$;

12. Normalizing $f^{(k)} + \frac{1+\mu\rho}{\lambda\rho}\Phi(p^{(k+1)})$

13. Updating $b^{(k+1)}$ utilizing Eq. (2);
14. Updating $f^{(k+1)}$ by de-normalizing $b^{(k+1)}$;
15. end
16. end
17. return $f^{(K)}$ Output: Reconstructed image $f^{(K)}$ $$p^{(k+1)} = \frac{\lambda(p^{(0)} - Af^{(k)})}{1 + \lambda + \mu} \quad (1)$$

$$f^{(k+1)} = H^* S_{\frac{\xi}{\lambda\rho}}\left(H\left(f^{(k)} + \frac{1+\mu\rho}{\lambda\rho}\Phi(p^{(k+1)})\right)\right) \quad (2)$$

Thus, operation of the ACID system 202 may correspond to an iterative framework, as indicated in Table 1. Given input data $p^{(0)}$, a neural network $\Phi$ and a system matrix A. A stopping condition, i.e., the maximum number of iterations K, may be specified. Parameters $\zeta$, $\lambda$ and $\mu$ are configured to control the iterative process and the regularization strength may then be specified and/or determined empirically. In one nonlimiting example, the parameter $\mu$ may be set to 0.

When k=1, $\Phi(p^{(0)})$ may be computed and then normalized. The goal of the normalization operator is to facilitate the adjustment of the regularization parameters for different applications. Then, $b^{(1)}$ may then be updated according to Eq. (2). Next, $f^{(1)}$ may be updated by de-normalizing $b^{(1)}$. When 1<k<K+1, the residual data may be determined according to Eq. (1). Since the residual data may not be in the dynamic range of the original data, the residual data may be normalized into the original range to support efficient operation of the neural network (Line #9 in Table 1). After the neural network (i.e., reconstruction network circuitry) predicts a residual image, the de-normalization operator may be applied on the prediction to provide consistency of the reconstruction results.

$$f^{(k)} + \frac{1+\mu\rho}{\lambda\rho}\Phi(p^{(k+1)})$$

may then be normalized and provided to the compressed sensing-based regularization module (i.e., compressed sensing circuitry) to encourage image sparsity. The updated image $f^{(k+1)}$ (i.e. refined image data 106) may then be obtained after the de-normalization.

Thus, the ACID architecture (hybrid image reconstruction system 202) for stabilizing deep tomographic image reconstruction may include deep reconstruction, compressed sensing-based sparsity promotion, analytic mapping and iterative refinement. $p^{(0)}$ corresponds to original tomographic data (i.e., input data), and $p^{(K_{ACID})}$, $k_{ACID}$=1, 2, 3, . . . , $K_{ACID}$, represents an estimated residual dataset in the $k_{ACID}{}^{th}$ iteration between $p^{(0)}$ and the currently reconstructed counterpart. $\Phi(p^{(K_{ACID})})$ is an output of the deep reconstruction module, and $f^{(K_{ACID})}$ represents the image after compressed sensing-based regularization.

Figure 3:
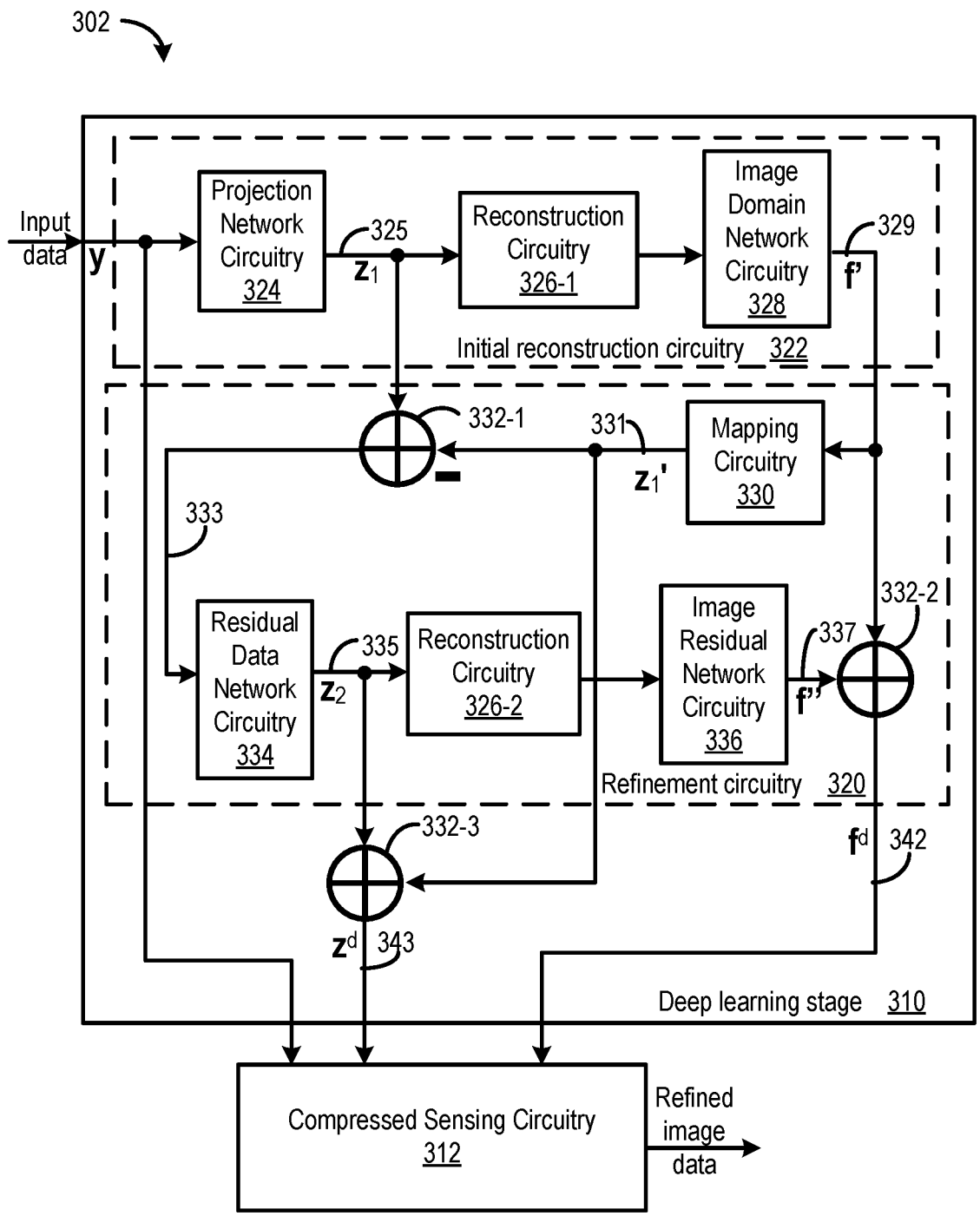
FIG. 3 illustrates a functional block diagram of another embodiment of a hybrid image reconstruction system according to the present disclosure.

FIG. 3 illustrates a functional block diagram of another embodiment of a hybrid image reconstruction system 302 according to the present disclosure. System 302 is another example of hybrid image reconstruction system 102 of FIG. 1. System 302 may be considered as a dual-domain residual-based optimization network ("DRONE"). System 302 includes a deep learning stage 310 and a compressed sensing circuitry 312. The deep learning stage 310 is configured to receive input data ($\gamma$), and the compressed sensing circuitry 312 is configured to provide image data as output. The input data may be sparse, as described herein. The deep learning stage 310 includes initial reconstruction network circuitry 322 and refinement circuitry 320. The initial reconstruction circuitry 322 corresponds to an embedding module, the refinement circuitry 320 corresponds to a refinement module and compressed sensing circuitry 312 corresponds to an awareness module, as described herein. Deep learning stage 310 is one example of deep learning stage 110 and compressed sensing circuitry 312 is one example of compressed sensing stage 112 of FIG. 1.

The initial reconstruction circuitry 322 includes a projection network circuitry 324, a first reconstruction circuitry 326-1, and an image domain network circuitry 328. The projection network circuitry 324 and the image domain network circuitry 328 may both correspond to deep learning neural networks. The refinement circuitry 320 includes a mapping circuitry 330, a first summer 332-1, a second summer 332-2, a residual data network circuitry 334, a second reconstruction circuitry 326-2, an image residual network circuitry 336, and a third summer 332-3. The residual data network circuitry 334, and the image residual network circuitry 336 may both correspond to deep learning neural networks. It may be appreciated that the projection network circuitry 324 and the residual data network circuitry 334 may be configured to operate in the input data domain, e.g., tomographic data domain. Similarly, the image domain network circuitry 328 and the image residual network circuitry 336 may be configured to operate in the image data domain.

The reconstruction circuitry 326-1, 326-2 are configured to reconstruct image domain data from input domain data. The mapping circuitry 330 is configured to generate input domain (i.e., projection domain) data from image domain data. The mapping circuitry 330 may thus have a corresponding matrix, $A_2$, configured to map image domain data to the projection domain. The compressed sensing circuitry 312 is configured to receive input data, y, as well as processed input domain data ($z^d$) 343 and image domain data ($f^d$) 342 from deep learning stage 310, as described herein.

In operation, the initial reconstruction circuitry 322 is configured to receive input data corresponding to a sparse data set, y. Projection network circuitry 324 is configured to extend the sparse data set y to a relatively high-dimensional estimated data set: estimated projection data set ($z_1$) 325. As used herein, "estimated projection data set" corresponds to estimated measurements, thus, estimated measurements may be highly dimensional. It may be appreciated that an implicit interpolation operation may introduce errors. Projection network circuitry 324 may be configured to interpolate part or all of the projection data set. It may be appreciated that prediction errors in the projection domain may be greater when the data are extended to angular positions further away from the viewing angles physically used. In one nonlimiting example, 60 measured views may be extended to a dataset of 180 views forming a half-scan, which is sufficient for the awareness module (i.e., compressed sensing circuitry 312) to generate relatively high-quality images. However, this disclosure is not limited in this regard. Reconstruction circuitry 326-1 may then be configured to reconstruct the estimated projection data set 325 into a corresponding raw image using, for example, FBP reconstruction ($A_2^+$). Image domain network circuitry 328 may then be configured to post-process the FBP reconstruction output from reconstruction circuitry 326-1 into an estimated image data set 329 corresponding to improved image f'. The image domain network circuitry 328 may thus correspond to an image domain neural network.

The operations of initial reconstruction circuitry 322 may be described by Eq. (3) as:

$$f' = \phi_{s_2}(A_2^+(\Phi_{s_1}(y))) \quad (3)$$

where y is the sparse input data set, $\Phi_{s_1}$ represents projection network circuitry 324 and $S_1$ represents the parameters of projection network circuitry 324, $A_2^+$ represents filtered back projection (FBP) reconstruction operations of reconstruction circuitry 326-1, $\phi_{s_2}$ represents image domain network circuitry 328 and $S_2$ represents the parameters of image domain network circuitry 328, and f' is the estimated image data set 329.

In an embodiment, projection network circuitry 324 may be implemented as an encode-decode network. For example, the encode-decode network may be related to a U-net and may include shortcut connections. Thus, example projection network circuitry 324 may be configured to extract an intrinsic latent code in the data domain. Continuing with this example, mean squared error (MSE) between labels and predictions may be employed as the loss function, during training. As the generator, an encode-decode architecture is based on U-net with shortcuts to produce images as faithfully as possible, and then the discriminator is trained on the generated images and corresponding labels. Projection network circuitry 324 may thus be trained on labeled data, which is then used for data extension to facilitate reconstruction of image features. It may be appreciated that the data expanded from sparse views may be embedded in a higher-dimensional measurement space defined by the trained projection network circuitry 324. In the training process, the original data may be expanded via nearest neighbor interpolation, and the interpolated data may then be refined by projection network circuitry 324, subject to the constraint that at the locations of the original data the original input will be kept as output to ensure the consistency.

Image reconstruction may be implemented using the image domain network circuitry 328 of initial reconstruction circuitry 322. Image domain network circuitry 328 may be trained on paired FBP images. In one nonlimiting example, a generative adversarial network with the Wasserstein distance (WGAN) as the discrepancy measure between distributions may avoid over-smoothed edges and/or missing details and support recovery of textures and/or signatures. In an embodiment, image domain network circuitry 328 may include a generative adversarial network (GAN) with parameters $\phi_{s_2}$, and configured to remove the image artifacts. The GAN includes a generator ("G") and a discriminator ("D") and may utilize the Wasserstein distance as the discrepancy measure between distributions. Image domain network circuitry 328 may thus correspond to a WGAN. During WGAN training, D and G may be optimized by mini-maximizing the following objective function:

$$\min_G \max_D (L_{MSE}(u, G(t)) + \lambda_{wgan} \cdot L_{WGAN}(D, G)), \quad (4a)$$

$$L_{WGAN}(G, D) = \left\{ \begin{array}{c} -E_u[D(u)] + E_t[D(G(t))] + \\ \eta E[(\nabla_{\hat{u}} D(\hat{u})_2 - 1)^2] \end{array} \right\}. \quad (4b)$$

It may be appreciated that the first two terms on the right side of Eq. (4b) are configured to estimate the Wasserstein distance, the last term is the gradient penalty for regularization, $\hat{u}$ may be uniformly sampled along straight lines connecting pairs of generated and actual samples, t represents corrupted images reconstructed using FBP, u is the corresponding label, and $\eta$ is a constant for weighting parameter. In one nonlimiting example, $\eta$ may be equal to ten. However, this disclosure is not limited in this regard. As is known, in a GAN, networks D and G are trained alternatively by fixing one and updating the other.

Within the GAN framework, a neural network having an encode-decode architecture based on U-net with shortcuts may be treated as a generator configured to produce images as faithfully as possible. The generated images and corresponding labels are treated as input to the discriminator. Thus, the image domain network circuitry 328 may be configured to remove sparse artifacts and to enhance image quality, via, for example, noise reduction. The discriminator discriminates between the output and label, and it informs the generator to improve image fidelity and structures.

Refinement circuitry 320 is configured to receive the estimated projection data set 325 ($z'_1$) and the estimated image data set 329 (f') from the initial reconstruction circuitry 322, and to provide as output the updated data-image pair ($z^d$, $f^d$). It may be appreciated that because interpolation in the projection domain may introduce errors, the initial reconstruction circuitry (i.e., embedding module) 322 may produce relatively more errors when, for example, relatively more projections are estimated over a wider angular range. On the other hand, a relatively limited number of views may compromise performance in the image domain. In an embodiment, refinement circuitry 320 and compressed sensing circuitry 312 may be configured to solve this issue by keeping a balance between extending the number of views and refining the subsequent results iteratively.

Mapping circuitry 330 is configured to receive the estimated image data set 329 (f') and to map image domain data to the projection domain, producing corresponding projection data set 331 ($z'_1$) that corresponds to $A_2f'$. Summer 332-1 is configured to subtract $z'_1$ from the estimated projection data set, $z_1$, to yield residual data input 333, that is input to residual data network circuitry 334.

Similar to the initial reconstruction circuitry 322, refinement circuitry 320 includes two network circuitries: residual data network circuitry 334 and image residual network circuitry 336. There may be discrepancies between the outputs, $\{z_1, f'\}$, of the initial reconstruction circuitry 322 and corresponding ground truths, $\{z_0, f_0\}$. The re-sampled residual data from estimated image data set 329 (f'), i.e., residual data input 333 may be expressed as: $z_1-A_2f'$. In an embodiment, residual data network circuitry 334 may be trained to $\Phi_{s_3}$ to handle residual data, with the MSE between labels and predictions as loss function. $\Phi_{s_3}$ may thus correspond to parameters of the residual data network circuitry 334. The estimated data residual $z_2$ of the refinement circuitry 320 may then be expressed as:

$$z_2 = \Phi_{s_3}(z_1 - A_2 f'). \quad (5)$$

In addition or alternatively to the data difference computed by the trained data residual network according to Eq. (5), there may be an image difference between the output of the initial reconstruction circuitry 322 and the ground truth. Image residual network circuitry 336 may be trained and may have parameters $\phi_{s_4}$. The training may be configured to refine image details by minimizing the MSE between labels and predictions. In one nonlimiting example, training may include data from different patients in training each of the four networks in the DRONE architecture 302 configured to reduce the overfitting risk. A residual image, corresponding to an output of image residual network circuitry may then be defined as:

$$f'' = \phi_{s_4}(A_2^+(z_2)) \quad (6)$$

In an embodiment, similar to the projection network circuitry 324 in the initial reconstruction circuitry 322, residual data network circuitry 334 may be implemented as an encode-decode network. Residual data network circuitry 334 may be implemented with a similar encode-decode architecture except for an interpolation layer. It may be appreciated that $\Phi_{s_3}$ may generally converge relatively quickly. In other words, details of residual data network circuitry 334 may be relatively easy to learn. Thus residual data network circuitry 334 may be trained with relatively less data.

The image residual network circuitry 336 and network parameters, $\phi_{s_4}$, are configured to provide image accuracy. The image residual network circuitry 336 may thus include a discriminator network. A discriminator network may be configured to decrease quantitative scores. Thus, relatively high-dimensional data, $z_1$, and a corresponding image, f', may be improved simultaneously as:

$$z^d = z_2 + A_2 f' \quad (7)$$

and $$f^d = f' + g'' \quad (8)$$

where $\{z^d, f^d\}$ corresponds to the updated data-image pair. It may be appreciated that the updated image pair exhibit an improvement over the input data. The updated data-image pair may then be provided to the compressed sensing circuitry for possible further improvement.

Compressed sensing circuitry 312 (i.e., awareness module) may be configured as an optimization with constraint(s). For example, regarding regularization, a total variation (TV) method may be implemented in compressed sensing circuitry 312. In another example, other advanced sparsity priors may be used, such as dictionary learning. Advanced priors may improve the image quality but they are computationally demanding. In practice, reconstruction performance and computational overhead should be balanced.

As is known, sparse-view reconstruction is one example of a typical undetermined inverse problem, and there has not been a general solution that delivers good image quality if the number of views is relatively small, e.g., less than 100 views. Compressed sensing may provide a utility for, for example, sparse-data medical CT. In one nonlimiting example, a total variation minimization technique may be beneficial to image recovery with edge preservation. In an embodiment, a total difference for f may be defined as:

$$Wf = \sum_{n_h=2}^{N_H} \sum_{n_w=2}^{N_W} (|f(n_w, n_h) - f(n_w, n_h - 1)| + |f(n_w, n_h) - f(n_w - 1, n_h)|) \quad (9)$$

where the gradient magnitudes along an image border are set to zero.

The initialization and constraints play a role to reconstruct images from subsampled measurements because they can narrow the feasible region in the solution space. This idea leads to a combination of the deep learning-enabled data-image priors $\{z^d, f^d\}$ with the CS framework as:

$$\min_{f} \left\{ \frac{1}{2}\|y - A_1 f\|_F^2 + \frac{\lambda_1}{2}\|z^d - A_2 f\|_F^2 + \frac{\lambda_2}{2} Wf + \frac{\lambda_3}{2} W(f - f^d) \right\} \quad (10)$$

where $\lambda_1$ is a hyper-parameter and $\lambda_1 \geq 0$ is configured to balance two data fidelity terms: $\frac{1}{2}\|y - A_1 f\|_F^2$ and $\frac{1}{2}\|z^d - A_2 f\|_F^2$. $A_1$ represents the system matrix that projects to low-dimension data domain. If the error of $z^d$ is small, a greater value for $\lambda_1$ should be selected. $\lambda_2$ and $\lambda_3$ are hyper-parameters for regularizations, which are used to balance the data fidelity terms and regularization priors. In Eq. (10), the data-image priors from the neural networks are considered, because the $L_1$-norm optimization is utilized. Since it is difficult to obtain a solution directly, two vectors $v_1$ and $v_2$ may be introduced to replace f in Wf and $(f - f^d)$, respectively. Then, Eq. (10) becomes a constrained optimization problem:

$$\min_{f, v_1, v_2} \left\{ \frac{1}{2}\|y - A_1 f\|_F^2 + \frac{\lambda_2}{2} W v_1 + \frac{\lambda_1}{2}\|z^d - A_2 f\|_F^2 + \frac{\lambda_3}{2} W v_2 \right\}, \text{ s.t.,} \quad (11)$$

$$f = v_1, f - f^d = v_2.$$

Eq. (11) may then be converted into the following unconstrained optimization problems under proper conditions:

$$\min_{\{f,v_1,v_2,f_1,f_2\}} \left\{ \begin{array}{l} \frac{1}{2}\|y - A_1 f\|_F^2 + \frac{\lambda_1}{2}\|z^d - A_2 f\|_F^2 + \frac{\alpha_1}{2}\|f - v_1 - f_1\|_F^2 + \\ \frac{\lambda_2}{2} W v_1 + \frac{\lambda_3}{2} W v_2 + \frac{\alpha_2}{2}\|f - f^d - v_2 - f_2\|_F^2 \end{array} \right\} \quad (12)$$

where $f_1$ and $f_2$ are error vectors, and $\alpha_1 \leq 0$ and $\alpha_2 \geq 0$ are the coupling coefficients. Noting that there are five variables in Eq. (12), Eq. (12) can be divided into the following five sub-problems:

$$\min_f \left\{ \begin{array}{l} \frac{1}{2}\|y - A_1 f\|_F^2 + \frac{\alpha_1}{2}\|f - v_1^{(k)} - f_1^{(k)}\|_F^2 + \\ \frac{\lambda_1}{2}\|z^d - A_2 f\|_F^2 + \frac{\alpha_2}{2}\|f - f^d - v_2^{(k)} - f_2^{(k)}\|_F^2 \end{array} \right\}, \quad (13)$$

$$\min_{v_1} \left\{ \frac{\alpha_1}{2}\|f^{(k+1)} - v_1 - f_1^{(k)}\|_F^2 + \frac{\lambda_2}{2} W v_1 \right\}, \quad (14)$$

$$\min_{v_2} \left\{ \frac{\alpha_2}{2}\|f^{(k+1)} - f^d - v_2 - f_2^{(k)}\|_F^2 + \frac{\lambda_3}{2} W v_2 \right\}, \quad (15)$$

$$f_1^{(k+1)} = f_1^{(k)} - (f^{(k+1)} - v_1^{(k+1)}), \quad (16)$$

$$f_2^{(k+1)} = f_2^{(k)} - (f^{(k+1)} - f^d - v_2^{(k+1)}), \quad (17)$$

where k denotes the index for the current iteration. Regarding the sub-problem Eq. (13), the minimizer is configured to satisfy the condition of the derivative equaling zero, i.e., $$A_1^T(A_1 f - y) + \alpha_1(f - v_1^{(k)} - f_1^{(k)}) + \lambda_1 A_2^T(A_2 f - z^d) + \alpha_2(f - f^d - v_2^{(k)} - f_2^{(k)}) = 0. \quad (18)$$

f may then be updated as $$f^{(k+1)} = f^{(k)} - (A_1^T A_1 + \lambda_1 A_2^T A_2 + \alpha_1 + \alpha_2)^{-1} \{\lambda_1 A_2^T (A_2 f^{(k)} - z^d) + A_1^T(A_1 f^{(k)} - y) + \alpha_1(f^{(k)} - v_1^{(k)} - f_1^{(k)}) + \alpha_2(f^{(k)} - f^d - v_2^{(k)} - f_2^{(k)})\}, \quad (19)$$

where $A_1^T$ and $A_2^T$ can be computed using an ART, SART, or another classic algorithm. An analytic reconstruction method, i.e., $A_1^T$ and $A_2^T$ may be replaced with $A_1^+$ and $A_2^+$, and $A_1^+$ and $A_2^+$, and $A_1^T A_1$ and $A_2^T A_2$ may be treated as identical transforms. FBP may be employed for fast initial image reconstruction. The optimization of Eq. (14) corresponds to the total variation minimization problem. First $f(n_w, n_h) - f(n_w, n_h - 1)$ and $f(n_w, n_h) - f(n_w - 1, n_h)$ may be replaced with $d_1(n_w, n_h)$ and $d_2(n_w, n_h)$, and then Eq. (9) may be substituted into Eq. (14) to obtain $$\min_{\{v_1, d_1, d_2\}} \quad (20)$$

$$\left\{ \frac{1}{2}\|f^{(k+1)} - v_1 - f_1^{(k)}\|_F^2 + \frac{\lambda_2}{2} \times \sum_{n_h=2}^{N_H} \sum_{n_w=2}^{N_W} \left( \begin{array}{l} |d_1(n_w, n_h)| + |d_2(n_w, n_h)| + \\ \frac{\rho}{2}\|d_1(n_w, n_h) - (f(n_w, n_h) - f(n_w, n_h - 1))\|_2^2 + \\ \frac{\rho}{2}\|d_1(n_w, n_h) - (f(n_w, n_h) - f(n_w - 1, n_h))\|_2^2 \end{array} \right) \right\}.$$

$v_1$ may be updated using, for example, a Chambolle Antonin method. Eq. (20) corresponds to a typical image recovery task using TV minimization, and three variables (i.e., $d_1$, $d_2$ and $v_1$) may be updated using the alternating minimization strategy. In one nonlimiting example, the TV minimization may be implemented by the denoise_tv_chambolle function in the scikit-image library. The maximum number of iterations may be set to 100, with the other parameters as per default except for the denoising weight. For example, the denoising weight for updating $v_1$ may be set as $\beta_1$, which may be optimized for specific applications. The solution to Eq. (15) for $v_2$ is the same for $v_1$, where the denoising weight is set to $\beta_2$ in a task-specific fashion.

Generally, this disclosure relates to a hybrid image reconstruction system. In some embodiments, the hybrid image reconstruction system includes a deep learning stage and a compressed sensing stage. The deep learning stage is configured to receive an input data set that includes measured tomographic data and to produce a deep learning stage output. The deep learning stage includes a mapping circuitry, and at least one artificial neural network. The mapping circuitry is configured to map image domain data to a tomographic data domain. The compressed sensing stage is configured to receive the deep learning stage output and to provide refined image data as output. In one embodiment, the hybrid image reconstruction system may correspond to an analytic compressive iterative deep framework ("ACID"). In another embodiment, the hybrid image reconstruction system may correspond to a dual-domain residual-based optimization network (DRONE). A deep reconstruction network may be stabilized in a hybrid model that combines deep learning and compressed sensing.

Figure 4:
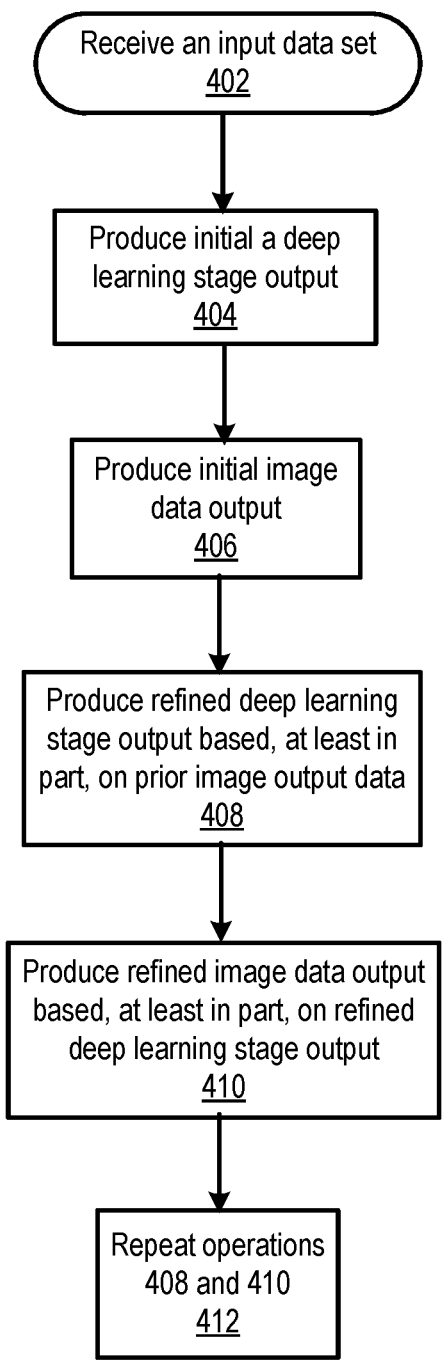
FIG. 4 is a flowchart of example hybrid image reconstruction operations consistent with various embodiments of the present disclosure.

FIG. 4 is a flowchart 400 of example hybrid image reconstruction operations consistent with various embodiment of the present disclosure. In particular, the flowchart 400 illustrates producing refined image data for input data that includes tomographic data. The operations of flowchart 400 may be performed by, for example, hybrid image reconstruction system 102 (e.g., deep learning stage 110 and/or compressed sensing stage 112) of FIG. 1 and/or hybrid image reconstruction system 202 (e.g., deep learning stage 210 and/or compressed sensing stage 212) of FIG. 2.

Operations of flowchart 400 may begin with receiving an input data set at operation 402. The input data set may include tomographic data. An initial deep learning stage output may be produced at operation 404. The deep learning stage may include at least one artificial neural network. Operation 406 may include producing an initial image data output. Operation 408 may include producing a refined deep learning stage output based, at least in part, on prior image output data. Operation 410 may include producing a refined image data output based, at least in part, on refined deep learning stage output. Operations 408 (producing a refined deep learning stage output based, at least in part, on prior image output data) and 410 (producing a refined image data output based, at least in part, on refined deep learning stage output) may be repeated at operation 412. Repeating operations 408 and 410 is configured to provide iterative refinement of the output image data configured to provide gradual image quality improvement.

Thus, refined image data may be produced for input data that includes tomographic data.

Figure 5:
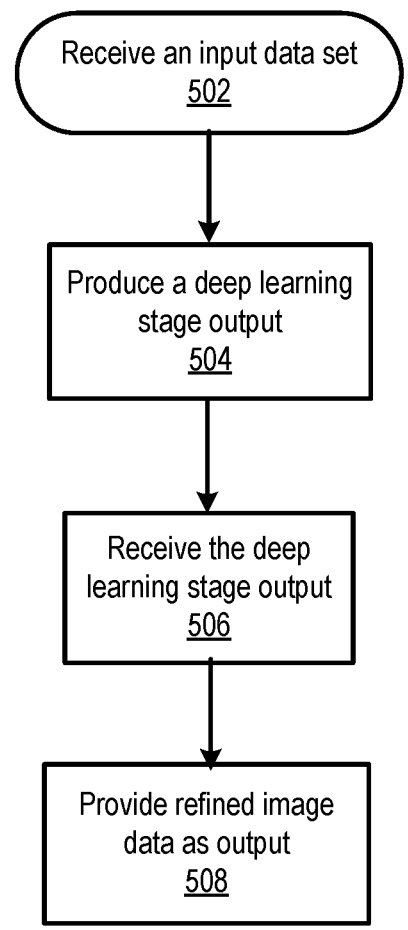
FIG. 5 is a flowchart of another example hybrid image reconstruction operations consistent with various embodiments of the present disclosure.

FIG. 5 is a flowchart 500 of example hybrid image reconstruction operations consistent with various embodiment of the present disclosure. In particular, the flowchart 500 illustrates producing refined image data for input data that includes tomographic data. The operations of flowchart 500 may be performed by, for example, hybrid image reconstruction system 102 (e.g., deep learning stage 110 and/or compressed sensing stage 112) of FIG. 1 and/or hybrid image reconstruction system 302 (e.g., deep learning stage 310 and/or compressed sensing circuitry 312) of FIG. 3.

Operations of flowchart 500 may begin with receiving an input data set at operation 502. The input data set may include tomographic data. A deep learning stage output may be produced at operation 504. The deep learning stage may include at least one artificial neural network. Operation 506 may include receiving the deep learning stage output. For example, the deep learning stage output may be received by a compressed sensing stage. Refined image data may be provided as output at operation 508.

Thus, refined image data may be produced for input data that includes tomographic data. As used in any embodiment herein, the term "logic" or "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may include, for example, singly or in any combination, hardwired circuitry, programmable circuitry such as computer processors including one or more individual instruction processing cores, state machine circuitry, and/or firmware that stores instructions executed by programmable circuitry. The logic or modules may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, a field-programmable gate array (FPGA), a programmable logic device (PLD), a complex programmable logic device (CPLD), etc.

Processor circuitry 132 may include, but is not limited to, a single core processing unit, a multicore processor, a graphics processing unit, a microcontroller, an application-specific integrated circuit (ASIC), a field programmable gate array (FPGA), a programmable logic device (PLD), etc.

Memory circuitry 134 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively memory 134 may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

What is claimed is:

1. A hybrid image reconstruction system, the system comprising:
    a deep learning stage configured to receive an input data set comprising measured tomographic data and to produce a deep learning stage output, the deep learning stage comprising a mapping circuitry, and at least one artificial neural network, the mapping circuitry configured to map image domain data to a tomographic data domain; and
    a compressed sensing stage configured to receive the deep learning stage output and to provide refined image data as output.

2. The system of claim 1, wherein the deep learning stage comprises an initial reconstruction network circuitry, and a deep learning stage refinement circuitry comprising at least one mapping circuitry, and at least one residual reconstruction network circuitry, and
    the compressed sensing stage comprises an initial compressed sensing circuitry, and a compressed sensing stage refinement circuitry comprising at least one refinement compressed sensing circuitry,
    at least a portion of the deep learning stage refinement circuitry and at least a portion of the compressed sensing stage refinement circuitry corresponding to a refinement stage,
    the initial reconstruction network circuitry configured to receive the input data set and to reconstruct a corresponding initial image data, and the initial compressed sensing circuitry configured to regularize the initial image data to yield an estimated image data,
    each mapping circuitry configured to receive a prior compressed sensing circuitry image data output and to produce a respective corresponding projection data set, and
    each residual reconstruction network circuitry configured to receive a respective residual projection data set corresponding to a difference between the input data set and the respective prior corresponding projection data set and to determine a respective corresponding residual image data, and
    each refinement compressed sensing circuitry configured to receive a sum of a prior compressed sensing circuitry image data output and the respective corresponding residual image data and to produce a respective refined image data output.

3. The system of claim 2, wherein a system architecture corresponds to an unrolled network architecture that comprises a plurality of refinement stages.

4. The system of claim 3, wherein a respective refinement stage comprises a respective mapping circuitry, a respective residual reconstruction circuitry and a respective refinement compressed sensing circuitry.

5. The system of claim 2, wherein each residual projection data set is normalized, and each residual image data is denormalized.

6. The system of claim 1, wherein the deep learning stage comprises an initial reconstruction circuitry, and a refinement circuitry,
    the initial reconstruction circuitry configured to receive the input data set, to determine an estimated projection data set based, at least in part, on the input data set, and to determine an refined image data set based, at least in part, on the estimated projection data set, and
    the refinement circuitry configured to receive the estimated projection data set and the refined image domain data set, and to determine an updated data-image pair, the updated data-image pair corresponding to the deep learning stage output.

7. The system of claim 6, wherein the initial reconstruction circuitry comprises a projection network circuitry, and an image domain network circuitry, and the refinement circuitry comprises a residual data network circuitry, and an image residual network circuitry, each network circuitry corresponding to an artificial neural network configured to operate in a projection data domain or an image data domain.

8. The system of claim 6, wherein the input data set is sparse and the estimated measurements are relatively highly dimensional.

9. The system of claim 7, wherein the projection network circuitry and the image domain network circuitry each corresponds to a respective encode-decode network and the image domain network circuitry corresponds to a generative adversarial network (GAN).

10. The system of claim 1, wherein the input data is selected from the group comprising computed tomography (CT), magnetic resonance imaging (MRI), positron emission tomography (PET), and single photon emission computed tomography (SPECT) tomographic data.

11. A method for hybrid image reconstruction, the method comprising:
receiving, by a deep learning stage, an input data set comprising measured tomographic data;
producing, by the deep learning stage, a deep learning stage output, the deep learning stage comprising a mapping circuitry, and at least one artificial neural network, the mapping circuitry configured to map image domain data to a tomographic data domain;
receiving, by a compressed sensing stage, the deep learning stage output; and
providing, by the compressed sensing stage, refined image data as output.

12. The method of claim 11, wherein the deep learning stage comprises an initial reconstruction network circuitry, and a deep learning stage refinement circuitry comprising at least one mapping circuitry, and at least one residual reconstruction network circuitry, and the compressed sensing stage comprises an initial compressed sensing circuitry, and a compressed sensing stage refinement circuitry comprising at least one refinement compressed sensing circuitry, at least a portion of the deep learning stage refinement circuitry and at least a portion of the compressed sensing stage refinement circuitry corresponding to a refinement stage, and further comprising:
reconstructing, by the initial reconstruction network circuitry, a corresponding initial image data based, at least in part, on the input data set; and
regularizing, by the initial compressed sensing circuitry, the initial image data to yield an estimated image data;
producing, by each mapping circuitry, a respective corresponding projection data set based, at least in part on, a prior compressed sensing circuitry image data output;
producing, by each residual reconstruction network circuitry, a respective corresponding residual image data based, at least in part, on a respective residual projection data set corresponding to a difference between the input data set and the respective prior corresponding projection data set;
receiving, by each refinement compressed sensing circuitry, a sum of a prior compressed sensing circuitry image data output and the respective corresponding residual image data; and
producing, by each refinement compressed sensing circuitry, a respective refined image data output.

13. The method of claim 12, wherein a system architecture corresponds to an unrolled network architecture that comprises a plurality of refinement stages.

14. The method of claim 13, wherein a respective refinement stage comprises a respective mapping circuitry, a respective residual reconstruction circuitry and a respective refinement compressed sensing circuitry.

15. The method of claim 12, wherein each residual projection data set is normalized and each residual image data is denormalized.

16. The method of claim 11, wherein the deep learning stage comprises an initial reconstruction circuitry, and a refinement circuitry, and further comprising:
receiving, by the initial reconstruction circuitry, the input data set;
determining, by the initial reconstruction circuitry, an estimated projection data set based,
at least in part, on the input data set;
determining, by the initial reconstruction circuitry, an refined image data set based, at least in part, on the estimated projection data set;
receiving, by the refinement circuitry, the estimated projection data set and the refined image domain data set; and
determining, by the refinement circuitry, an updated data-image pair, the updated data image pair corresponding to the deep learning stage output.

17. The method of claim 16, wherein the initial reconstruction circuitry comprises a projection network circuitry, and an image domain network circuitry, and
the refinement circuitry comprises a residual data network circuitry, and an image residual network circuitry, each network circuitry corresponding to an artificial neural network configured to operate in a projection data domain or an image data domain.

18. The method of claim 16, wherein the input data set is sparse and the estimated measurements are relatively highly dimensional.

19. The method of claim 17, wherein the projection network circuitry and the image domain network circuitry each corresponds to a respective encode-decode network and the image domain network circuitry corresponds to a generative adversarial network (GAN).

20. The method of claim 11, wherein the input data is selected from the group comprising computed tomography (CT), magnetic resonance imaging (MRI), positron emission tomography (PET), and single photon emission computed tomography (SPECT) input data.

21. The system of claim 1, wherein the compressed sensing stage implements a total variation method.

22. The system of claim 1, wherein the compressed sensing stage implements a low-rank method.

23. The system of claim 1, wherein the compressed sensing stage implements a dictionary learning method.

* * * * *